(12) United States Patent
Dix

(10) Patent No.: US 7,187,157 B1
(45) Date of Patent: Mar. 6, 2007

(54) POWER SUPPLY REMOTE VOLTAGE SENSING

(75) Inventor: Christopher W. Dix, Hillsboro, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 265 days.

(21) Appl. No.: 10/728,685

(22) Filed: Dec. 5, 2003

(51) Int. Cl.
*G05F 1/40* (2006.01)
*H02H 7/00* (2006.01)

(52) U.S. Cl. ..................................... 323/271
(58) Field of Classification Search ............... 323/265, 323/266, 268, 271, 282, 285, 288
See application file for complete search history.

(56) References Cited

U.S. PATENT DOCUMENTS 4,644,251 A 2/1987 Rathke
6,175,221 B1 * 1/2001 Kalpakjian et al. ......... 323/268
6,329,856 B1 12/2001 Tabler et al.
6,479,975 B1 * 11/2002 Plankensteiner et al. .... 323/316
6,693,410 B1 * 2/2004 Terrien ........................ 323/274
6,870,354 B2 * 3/2005 Nishimaki ................... 323/284
6,879,502 B2 * 4/2005 Yoshida et al. ............... 363/60

OTHER PUBLICATIONS

Summit Microelectronics, Inc. Data Sheet for the SMT4004, pp. 1-34.
Summit Microelectronics, Inc. Data Sheet for the SMT4214, pp. 1-17.
Linear Technology, LTC2921/LTC2922 Series, Power Supply Tracker With Input Monitors, pp. 1-20.

* cited by examiner

*Primary Examiner*—Matthew V. Nguyen

(57) ABSTRACT

In accordance with an embodiment of the present invention, two transistors are simultaneously controlled by a controller to control the application of power to a load and monitor a voltage level at the load. The controller may control the application of power to a number of loads simultaneously and may further provide voltage tracking for the loads.

18 Claims, 2 Drawing Sheets

POWER SUPPLY REMOTE VOLTAGE SENSING

TECHNICAL FIELD

The present invention relates generally to electrical circuits and, more particularly, to power supplies.

BACKGROUND

Power supplies (e.g., direct current (DC) converters) are typically employed for electrical devices, such as with integrated circuit applications, to provide the desired power supply voltages. For example, FIG. 1 shows a circuit 100 illustrating a conventional DC-to-DC power supply converter 102, with input terminals 110 and output terminals 112, coupled to a load 104. Resistors 106 represent trace (e.g., lead or wire) and connector resistances (i.e., associated supply and return path resistances) between converter 102 and load 104.

As an example for low current load applications, remote sensing of a voltage level at load 104 is not required, because resistors 106 are typically less than an ohm and internal feedback resistors 108, which may be 1,000 ohms or more, maintain a desired voltage level at output terminals 112 and at load 104. However, as the current through load 104 increases, an undesired voltage drop will also increase across resistors 106, which may result in an under-voltage situation at load 104. For example, if a resistance of each resistor 106 is 0.01 ohms and a current level through load 104 is 10 amps, a voltage level at load 104 will be reduced by 0.20 volts. If the desired voltage level at load 104 is 1.2 volts, the error (0.20 volts) will exceed fifteen percent, which is generally too far out of tolerance for typical applications.

To compensate for this undesired voltage drop, remote sense paths 114 may be coupled between sense terminals 116 of converter 102 and load 104 to provide direct feedback from load 104 and allow converter 102 to actively maintain the desired voltage level at load 104 (i.e., via remote sensing). A power metal oxide semiconductor field effect transistor (MOSFET) may also be inserted between output terminal 112 (e.g., out+) of converter 102 and load 104 (i.e., the supply path) to control when load 104 receives power from converter 102. However, an on-resistance of the power MOSFET (e.g., 0.01 ohms) adds to the resistance of resistor 106 to further decrease a voltage level at load 104. Furthermore, by including the power MOSFET in the supply path, remote sensing becomes more complex and difficult.

For example, if remote sense paths 114 are connected between converter 102 and load 104 when the power MOSFET is switched off, the feedback voltage provided to converter 102 via remote sense paths 114 will be approximately zero volts and an output voltage of converter 102 may be unreliable. As an example, converter 102 may provide a maximum voltage output or a voltage output that oscillates wildly, which may result in damage to converter 102 or to surrounding circuitry. As a result, there is a need for improved power supply techniques.

SUMMARY

Systems and methods are disclosed herein to provide power supply systems for electrical devices and to provide remote voltage sensing techniques to assist in maintaining desired voltage levels at a load. For example, in accordance with an embodiment of the present invention, a power MOSFET and a small signal level MOSFET are simultaneously controlled by a controller to control the application of power to a load and sense a voltage level at the load. The controller may control the application of power to a number of loads simultaneously and may further provide voltage tracking for the loads.

More specifically, in accordance with one embodiment of the present invention, a circuit includes a first transistor adapted to connect an output terminal of a first power supply to a first load; a second transistor adapted to connect a sense terminal of the first power supply to the first load; and a controller adapted to provide an output signal to the first transistor and the second transistor to control the first transistor and the second transistor.

In accordance with another embodiment of the present invention, a power supply system includes a power supply adapted to provide a first voltage; a load adapted to receive the first voltage from the power supply; a first transistor coupled to an output terminal of the power supply and to the load; a first resistor coupled to a gate terminal of the first transistor; a second transistor coupled to a sense terminal of the power supply and to the load; and a second resistor coupled to a gate terminal of the second transistor, wherein a first control signal provided via the first resistor and the second resistor controls the first transistor and the second transistor, respectively.

In accordance with another embodiment of the present invention, a method of providing remote voltage sensing at a load includes providing a supply voltage from a power supply to the load; and providing feedback of the supply voltage at the load to the power supply, wherein the providing of the supply voltage and the providing of the feedback occurs approximately simultaneously via a first control signal.

In accordance with another embodiment of the present invention, a power supply control circuit includes a power supply controller adapted to provide a control signal to control the application of a power supply voltage from a power supply to a load, the power supply controller having an output terminal adapted to provide the control signal; and a first transistor, under control of the power supply controller via the control signal, adapted to connect a feedback path for remote sensing from the load to the power supply at approximately the same time as the application of the power supply voltage from the power supply to the load.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Embodiments of the present invention and their advantages are best understood by referring to the detailed description that follows. It should be appreciated that like

DETAILED DESCRIPTION

Figure 1:
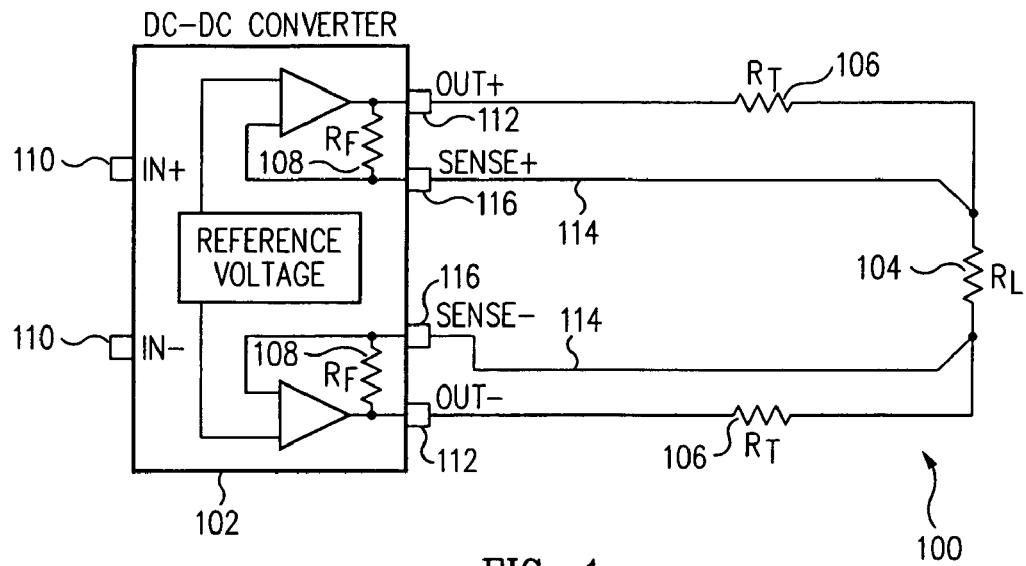
FIG. 1 shows a circuit diagram illustrating a conventional power supply system.
Figure 2:
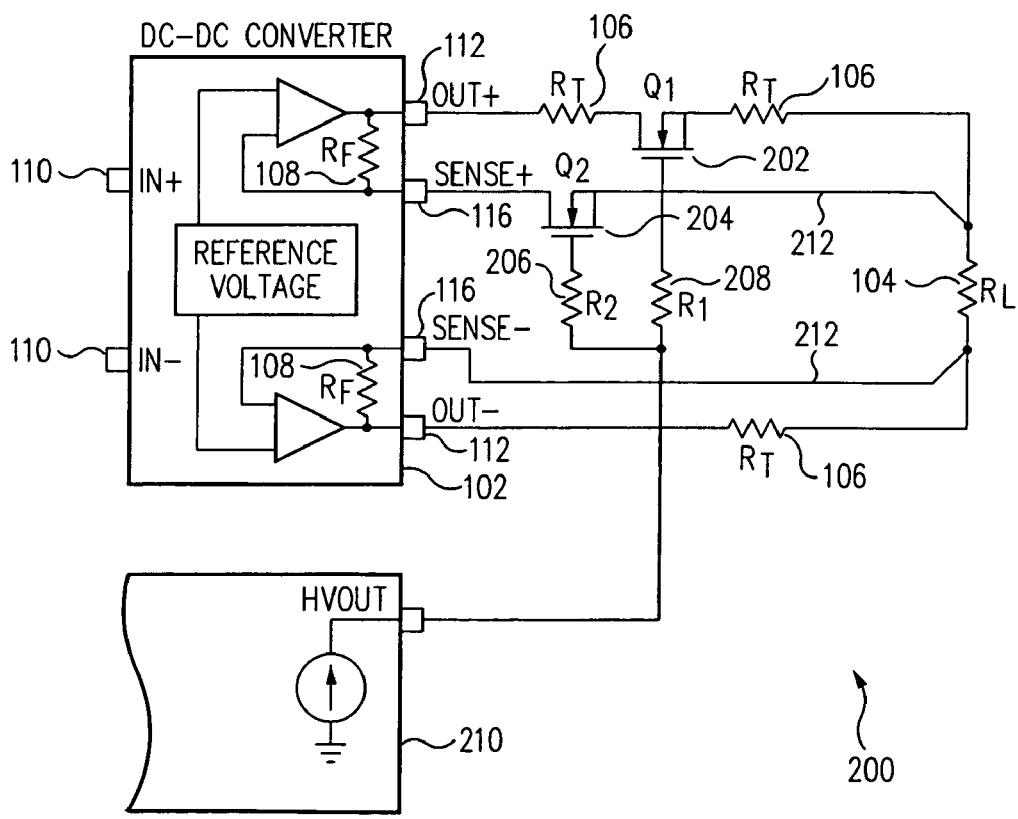
FIG. 2 shows a circuit diagram illustrating a power supply system in accordance with an embodiment of the present invention.

FIG. 2 shows a circuit 200 illustrating a power supply system in accordance with an embodiment of the present invention. Circuit 200 includes transistors 202 and 204, resistors 206 and 208, and a controller 210, in addition to converter 102 and load 104.

Transistor 202 (e.g., a power MOSFET) functions as a controllable switch for applying power from converter 102 to load 104 (i.e., selectively coupling output terminal (out+) 112 to load 104). Transistor 204 (e.g., a signal level or small signal level MOSFET) functions as a controllable switch for selectively coupling sense terminal (sense+) 116 to load 104. Transistors 202 and 204 may be switched on at approximately the same time because both are controlled by controller 210 (e.g., their gate terminals are biased from the same driver) and their source terminals have approximately the same return path (e.g., through load 104).

As discussed herein, resistors 106 represent associated path resistances. In circuit 200, resistors 106 associated with the supply path are split between converter 102 and transistor 202 and between transistor 202 and load 104 simply to illustrate that there is a certain amount of resistance associated with the supply path on each side of transistor 202.

Resistors 206 and 208 are placed in the gate terminal paths of transistors 204 and 202, respectively. For example, resistor 208 may be placed in close physical proximity (e.g., as close as possible) to the gate terminal of transistor 202 to minimize parasitic oscillations associated with transistor 202. A resistance value of resistor 208 may be, for example, 10 to 200 ohms.

Resistor 206 may be employed to fine-tune a turn-on time constant of transistor 204, such as for example, to adjust for differences in threshold voltages and/or input capacitances of transistor 204 relative to transistor 202. For example, if transistor 204 is the same type of transistor as transistor 202 (e.g., both are power MOSFETs), a resistance value of resistor 206 may be, for example, approximately 100 ohms so that transistors 202 and 204 will switch on at approximately the same time. However, if transistor 204 is significantly smaller than transistor 202 (e.g., a signal level MOSFET versus a power MOSFET, respectively), transistor 204 will generally have a lower input capacitance (e.g., gate-to-source and gate-to-drain capacitance) and a resistance value of resistor 206 may be, for example, 0.1 to 1 million ohms.

In general, a timing of the sense paths 212 connection between converter 102 and load 104 must be synchronized to an application of power to load 104. For example, if the connection of remote sense paths 212 between converter 102 and load 104 is completed long after transistor 202 is switched on, a voltage step may occur at load 104, which may be undesirable in certain applications. If the connection of remote sense paths 212 between converter 102 and load 104 is completed long before transistor 202 is switched on, an over-voltage or an oscillation condition, as described previously, may occur.

By utilizing the techniques discussed in reference to circuit 200, sense terminal (sense+) 116 and output terminal (out+) 112 of converter 102 are coupled to load 104 at approximately the same time. Consequently, the remote voltage sensing function occurs at approximately the same time that power is applied to load 104 such that a desired voltage level at load 104 may be applied and maintained due to the stable feedback via remote sense paths 212 to converter 102.

It should also be understood that numerous modifications and variations are possible in accordance with the principles of the present invention. For example, although converter 102 is shown in an exemplary fashion as a DC-to-DC power converter, converter 102 may be any type of alternating current (AC) or DC power supply. Similarly, although transistors 202 and 204 are shown and described as N-channel MOSFETs, other types of transistors may be utilized, depending upon the requirements and desired application. For example, P-channel MOSFETs may be implemented when providing negative voltages to load 104. Transistors 202 and 204 may be coupled to output terminal (out−) 112 and sense terminal (sense−) 116, respectively, depending upon a desired application, rather than coupled to output terminal (out+) 112 and sense terminal (sense+) 116, respectively, as shown in FIG. 2. Furthermore, load 104 is shown in an exemplary fashion as a resistor, but may be any type of load, such as for example, an integrated circuit or other electrical device.

The various circuit elements shown in FIG. 2 may be discrete devices or one or more of the circuit elements may be combined in some fashion, for example, in accordance with one or more embodiments of the present invention. As an example, converter 102, load 104, transistors 202 and 204, resistors 206 and 208, and controller 210 may be discrete devices. Alternatively, for example, transistor 204 and resistor 206 may be incorporated into controller 210 or load 104.

Controller 210 is employed to simultaneously control (i.e., switch on and off) transistors 202 and 204 (e.g., a power MOSFET and a small signal MOSFET, respectively) for power supply remote voltage application and sensing. Controller 210 may represent a current source, a driver, or any other type of conventional controller that can be configured to provide an output signal (e.g., a current or a voltage).

Controller 210 may be programmable to permit a magnitude of its output signal or the rate at which the output signal increases or decreases (i.e., the ramp rate) to be varied. Alternatively, controller 210 may only provide a fixed voltage or current or a fixed voltage or current increase and decrease pattern.

Figure 3:
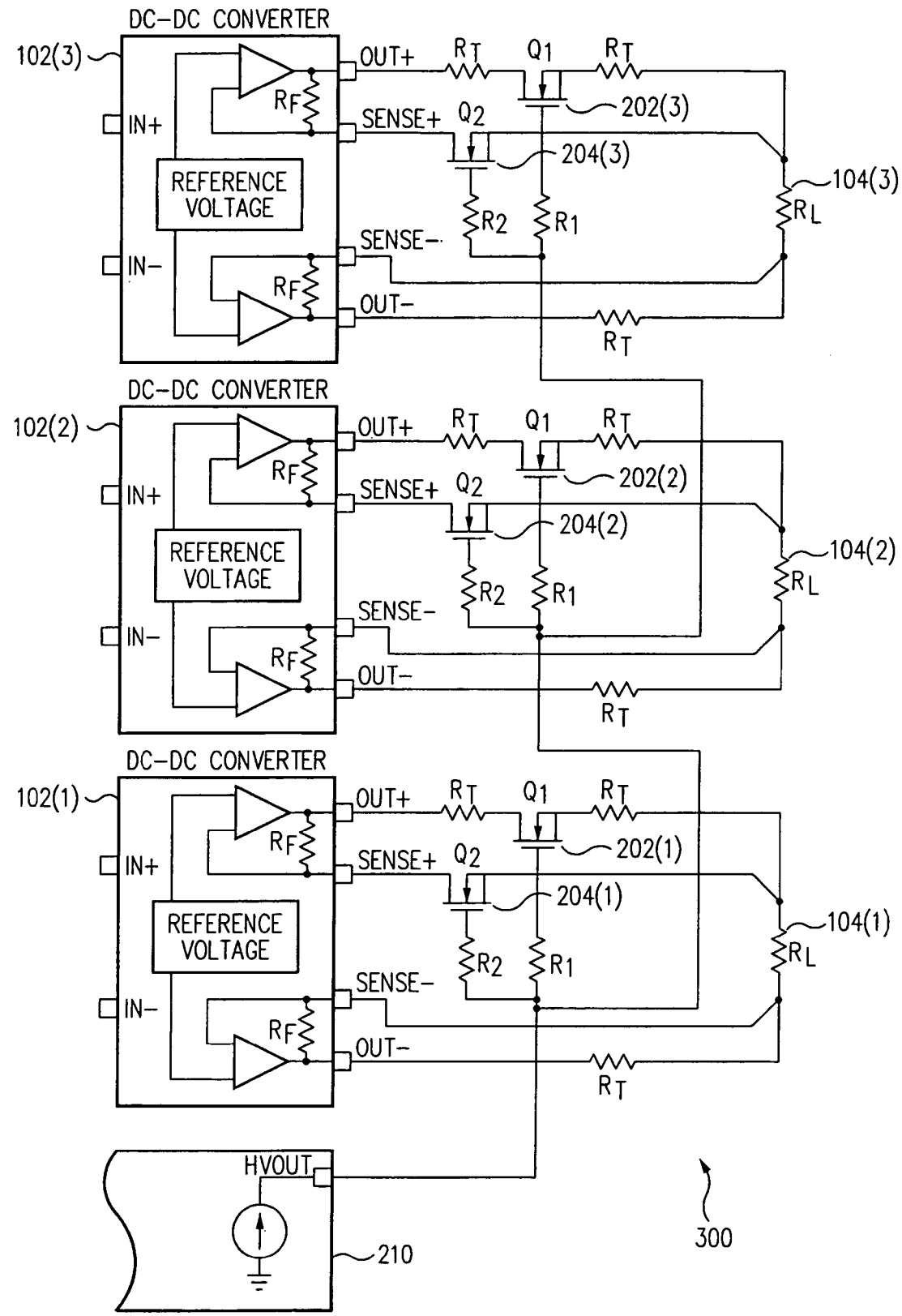
FIG. 3 shows a circuit diagram illustrating a power supply system in accordance with an embodiment of the present invention.

Controller 210 may also be utilized to control a number of power supplies. For example, FIG. 3 shows a circuit 300 illustrating a power supply system in accordance with an embodiment of the present invention. Controller 210 of circuit 300 controls transistors 202(1) and 204(1), 202(2) and 204(2), and 202(3) and 204(3) of associated converters 102(1) through 102(3) for applying power to and sensing a voltage level from corresponding loads 104(1) through 104(3).

Loads 104(1) through 104(3) may be separate electrical devices or represent one electrical device (e.g., an integrated circuit such as central processing unit, a programmable logic device, or an application specific integrated circuit) requiring more than one power source or different power supply voltages. For example, converters 102(1) through 102(3) may provide supply voltages of 3.3, 2.5, and 1.5 volts, respectively, to corresponding loads 104(1) through 104(3) within an integrated circuit. Thus, controller 210 controls the application of these voltages to loads 104(1) through 104(3).

Controller 210 may also be employed to provide voltage tracking (i.e., maintaining the voltages of multiple power supplies relative to each other when applying or removing power from their associated loads) for these power supplies (e.g., converters 102(1) through 102(3)). For example, controller 210 may control the application and/or removal of power from converters 102(1) through 102(3) to loads 104(1) through 104(3) via associated transistors 202(1) through 202(3) and 204(1) through 204(3) to maintain the voltage levels applied to loads 104(1) through 104(3) relative to each other.

As an example, for an exemplary power-up procedure, converters 102(1) through 102(3) bring their output voltages within regulation. Controller 210 then brings the gate terminal voltages of transistors 202(1) through 202(3) and 204(1) through 204(3) above a turn-on voltage threshold of these transistors in response to an internal or external triggering event (e.g., a signal indicating that the output voltages of converters 102(1) through 102(3) are within regulation). As the gate terminal voltages of transistors 202(1) through 202(3) and 204(1) through 204(3) continue to increase under control of controller 210, the voltages applied to loads 104(1) through 104(3) will track one another until they reach their desired respective supply voltage levels (e.g., 3.3, 2.5, and 1.5 volts, respectively).

An exemplary power-down procedure may be performed in a similar fashion with controller 210 decreasing the gate terminal voltages of transistors 202(1) through 202(3) and 204(1) through 204(3) and the voltages applied to loads 104(1) through 104(3) tracking one another. Further details regarding voltage tracking may be found in U.S. patent application Ser. No. 10/408,720 entitled "Maintaining Voltage Tracking for DC Power Supplies" and filed Apr. 7, 2003, which is incorporated herein by reference in its entirety.

The techniques discussed herein may be implemented, for example, to control the application of power to external loads or loads which are incorporated within the same electrical device (e.g., the same integrated circuit). Furthermore, one or more of the embodiments of the present invention may be implemented to provide remote power (e.g., voltage level) sensing to, for example, compensate for a supply and a return path voltage drop and optionally control a voltage level ramp rate during the application of and/or removal from power to one or more loads for one or more power supplies.

In accordance with an embodiment of the present invention, techniques are disclosed for controlling two or more transistors (e.g., MOSFETs) simultaneously to connect the output pins and the sense pins from a power supply to a load. The transistors may be synchronized to the same drive signal, which may eliminate a potential voltage step or undesired oscillation associated with conventional techniques. Furthermore, systems and methods discussed herein may greatly simplify the logic and control circuitry required to apply power to a circuit or implement power supply control as compared to conventional power supply control systems which may add significantly to the design complexity and cost.

Embodiments described above illustrate but do not limit the invention. It should also be understood that numerous modifications and variations are possible in accordance with the principles of the present invention. Accordingly, the scope of the invention is defined only by the following claims.

We claim:

1. A circuit comprising:
    a first transistor adapted to connect an output terminal of a first power supply to a first load;
    a second transistor adapted to connect a sense terminal of the first power supply to the first load; and
    a controller adapted to provide an output signal to the first transistor and the second transistor to control the first transistor and the second transistor.

2. The circuit of claim 1, wherein the controller switches on the first transistor and the second transistor to apply power from the first power supply to the first load and provide remote sensing from the first load to the first power supply at approximately the same time.

3. The circuit of claim 1, wherein the controller is programmable to vary a ramp rate of the output signal to control a voltage level ramp rate at the first load.

4. The circuit of claim 1, further comprising:
    a third transistor adapted to connect an output terminal of a second power supply to a second load; and
    a fourth transistor adapted to connect a sense terminal of the second power supply to the second load, wherein the controller provides the output signal to the third transistor and to the fourth transistor to control the application of power from the second power supply to the second load and provide remote sensing from the second load to the second power supply at approximately the same time.

5. The circuit of claim 4, wherein the controller controls the first, second, third, and fourth transistors to provide voltage tracking at the first load and the second load.

6. The circuit of claim 1, wherein the first and second transistors are power MOSFETs.

7. The circuit of claim 1, wherein the first and second transistors are a power MOSFET and a signal level MOSFET, respectively.

8. The circuit of claim 1, further comprising:
    a first resistor coupled between the controller and the first transistor; and
    a second resistor coupled between the controller and the second transistor, wherein the output signal is provided to the first and second transistors via the first and second resistors, respectively.

9. The circuit of claim 1, wherein the first power supply and the first load form part of the circuit.

10. A power supply system comprising:
    a power supply adapted to provide a first voltage;
    a load adapted to receive the first voltage from the power supply;
    a first transistor coupled to an output terminal of the power supply and to the load;
    a first resistor coupled to a gate terminal of the first transistor;
    a second transistor coupled to a sense terminal of the power supply and to the load; and
    a second resistor coupled to a gate terminal of the second transistor, wherein a first control signal provided via the first resistor and the second resistor controls the first transistor and the second transistor, respectively.

11. The power supply system of claim 10, further comprising a controller adapted to provide the first control signal to control the first transistor and the second transistor.

12. The power supply system of claim 11, wherein the controller switches the first and second transistors on and off at approximately the same time.

13. The power supply system of claim 11, wherein the controller is programmable to control the first and second transistors to vary a ramp rate of the first voltage at the load.

14. The power supply system of claim 10, further comprising:
    a plurality of power supplies adapted to provide corresponding voltages;

a plurality of third transistors coupled to corresponding output terminals of the corresponding plurality of power supplies and to the load;

a plurality of third resistors coupled to a gate terminal of corresponding ones of the third transistors;

a plurality of fourth transistors coupled to corresponding sense terminals of the corresponding plurality of power supplies and to the load;

a plurality of fourth resistors coupled to a gate terminal of corresponding ones of the fourth transistors; and a controller adapted to provide the first control signal via the first, second, third, and fourth resistors to control corresponding ones of the first, second, third, and fourth transistors.

15. The power supply system of claim 14, wherein the controller provides voltage tracking of the first voltage and the corresponding voltages supplied to the load.

16. A power supply circuit comprising:

a first switching means for selectively coupling a power supply voltage from a first power supply to a first load;

a second switching means for selectively coupling the first load to a sense terminal of the first power supply; and means for controlling the first and second switching means to provide at substantially the same time the power supply voltage to the first load and feedback from the first load to the sense terminal.

17. The power supply circuit of claim 16, further comprising:

a third switching means for selectively coupling a power supply voltage from a second power supply to a second load; and a fourth switching means for selectively coupling the second load to a sense terminal of the second power supply; wherein the controlling means controls the third and fourth switching means to provide at substantially the same time the power supply voltage from the second power supply to the second load and feedback from the second load to the sense terminal of the second power supply.

18. The power supply circuit of claim 17, wherein at least one of the first power supply and the second power supply is a DC to DC converter.

* * * * *